(12) United States Patent
Kiukkonen et al.

(10) Patent No.: US 10,045,220 B2
(45) Date of Patent: Aug. 7, 2018

(54) SENSING IN A COMMUNICATION SYSTEM

(75) Inventors: Niko Tapani Kiukkonen, Veikkola (FI); Markus Nentwig, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 401 days.

(21) Appl. No.: 13/696,366

(22) PCT Filed: May 20, 2010

(86) PCT No.: PCT/FI2010/050404
§ 371 (c)(1),
(2), (4) Date: Nov. 6, 2012

(87) PCT Pub. No.: WO2011/144794
PCT Pub. Date: Nov. 24, 2011

(65) Prior Publication Data
US 2013/0059543 A1    Mar. 7, 2013

(51) Int. Cl.
| | |
|---|---|
| *H04B 1/18* | (2006.01) |
| *H04W 16/14* | (2009.01) |
| *H04L 27/00* | (2006.01) |
| *H04W 8/00* | (2009.01) |
| *H04W 74/00* | (2009.01) |
| *H04W 74/08* | (2009.01) |
| *H04W 92/18* | (2009.01) |

(52) U.S. Cl.
CPC ......... *H04W 16/14* (2013.01); *H04L 27/0006* (2013.01); *H04W 8/005* (2013.01); *H04W 74/008* (2013.01); *H04W 74/0808* (2013.01); *H04W 92/18* (2013.01)

(58) Field of Classification Search
USPC ............... 455/161.1–169.2, 226.1–226.4, 455/67.11–67.7, 229
See application file for complete search history.

(56) References Cited

U.S. PATENT DOCUMENTS

| | | | | |
|---|---|---|---|---|
| 8,060,017 B2 * | 11/2011 | Schlicht | ............... | H04L 1/0015 455/41.2 |
| 8,208,391 B2 * | 6/2012 | Gurney | ............. | H04W 52/0229 370/252 |
| 8,244,185 B2 * | 8/2012 | Zhou | ..................... | H04W 24/10 370/341 |
| 8,670,721 B2 * | 3/2014 | Mody | ................. | H04L 63/1458 370/252 |
| 8,761,290 B2 * | 6/2014 | Kruglick | ............... | H04B 1/707 375/267 |
| 8,804,860 B2 * | 8/2014 | Muraoka | ............... | H04W 16/14 375/260 |
| 2004/0087310 A1 * | 5/2004 | Williamson | ........ | H04L 41/0896 455/450 |

(Continued)

OTHER PUBLICATIONS

International Search Report of PCT/FI2010/050404 dated Feb. 23, 2011.

(Continued)

*Primary Examiner* — Edward Urban
*Assistant Examiner* — Rui Hu
(74) *Attorney, Agent, or Firm* — Banner & Witcoff, Ltd.

(57) ABSTRACT

Usefulness of resource usage sensing information is determined by at least one node in a radio system. Transmission of sensing result information in the radio system is then controlled based at least in part on the determined usefulness.

20 Claims, 4 Drawing Sheets

(56) References Cited

U.S. PATENT DOCUMENTS

| | | | | |
|---|---|---|---|---|
| 2007/0032254 A1* | 2/2007 | Chen | H04W 16/14 | 455/509 |
| 2007/0117517 A1* | 5/2007 | Hui | H04W 72/085 | 455/67.11 |
| 2009/0016293 A1* | 1/2009 | Kang | H04W 72/085 | 370/329 |
| 2009/0052570 A1* | 2/2009 | Haykin | H04L 5/0037 | 375/267 |
| 2009/0149208 A1* | 6/2009 | Huttunen | H04W 24/10 | 455/509 |
| 2009/0186646 A1* | 7/2009 | Ahn | H04W 16/14 | 455/509 |
| 2010/0062718 A1* | 3/2010 | Zhou | H04W 24/10 | 455/67.11 |
| 2010/0069013 A1* | 3/2010 | Chaudhri | H04W 16/14 | 455/67.11 |
| 2010/0105419 A1* | 4/2010 | Kim | H04W 72/02 | 455/509 |
| 2010/0182928 A1* | 7/2010 | Wu | H04L 5/0007 | 370/252 |
| 2010/0248760 A1* | 9/2010 | Li | H04W 74/0808 | 455/500 |
| 2010/0248769 A1* | 9/2010 | Li | H04L 5/0062 | 455/509 |
| 2010/0279725 A1* | 11/2010 | Muraoka | H04W 72/02 | 455/509 |
| 2010/0296404 A1* | 11/2010 | Quadri | H04W 72/02 | 370/252 |
| 2010/0323694 A1* | 12/2010 | Altintas | H04B 1/005 | 455/434 |
| 2011/0070885 A1* | 3/2011 | Ruuska | H04W 16/14 | 455/434 |
| 2011/0085612 A1* | 4/2011 | Muraoka | H04W 16/14 | 375/260 |
| 2011/0176508 A1* | 7/2011 | Altintas | H04W 72/085 | 370/329 |
| 2011/0237200 A1* | 9/2011 | Reunamaki | H04W 16/14 | 455/67.11 |
| 2011/0258214 A1* | 10/2011 | Shu | H04L 41/0893 | 707/769 |
| 2012/0128043 A1* | 5/2012 | Hong | H04W 16/14 | 375/219 |
| 2012/0129462 A1* | 5/2012 | Pihlaja | H04W 16/14 | 455/67.11 |
| 2012/0142386 A1* | 6/2012 | Mody | H04W 16/14 | 455/509 |
| 2013/0039403 A1* | 2/2013 | Haykin | H04L 5/0037 | 375/224 |
| 2013/0064197 A1* | 3/2013 | Novak | H04W 72/085 | 370/329 |

OTHER PUBLICATIONS

Li, Y., et al, "Multi-node spectrum detection based on the credibility in cognitive radio system", 5th International Conference on Wireless Communications, Networking and Mobile Computing (WiCom 2009), Apr. 24, 2009, pp. 1-4—whole document.

Zhao, Y., et al, "Performance evaluation of cognitive radios: Metrics, utility functions, and methodology", Proceedings of the IEEE, vol. 97, No. 4, Apr. 2009, pp. 642-659—whole document.

Mitola, J., "Cognitive radio architecture evolution", Proceedings of the IEEE, vol. 97, No. 4, Apr. 2009, pp. 626-641—whole document.

* cited by examiner

SENSING IN A COMMUNICATION SYSTEM

This disclosure relates generally to sensing in a communication system, and more particularly to sensing of resource usage in a radio system.

A radio communication system can be seen as a facility that enables radio communication sessions between two or more entities such as mobile communication devices and/or other stations. In a radio system at least a part of communications between at least two stations occurs over a wireless link. Examples of wireless systems include public land mobile networks (PLMN), satellite based communication systems and different wireless local networks, for example wireless local area networks (WLAN). A wireless communication device, or node, is provided with an appropriate signal receiving and transmitting arrangement for enabling communications via appropriate channels with other nodes. A communication device may be arranged to communicate, for example, data for carrying communications such as voice, electronic mail (email), text message, multimedia, control information, other data, for enabling internet access and so on.

Cognitive radio systems have been proposed. A cognitive system exploits the possibility of secondary users to transmit when no primary users are present in a given frequency band or do not use another radio resource at a given time. Primary users can comprise any radio devices, for example, TV stations, wireless microphones or nodes of cellular systems. Secondary users can correspondingly be any users who have a lower priority and/or who can use a resource only when this can be done without disturbing primary users.

Cognitive radio typically refers to a device which can detect which communication channels are in use by primary users and which are not. A function of a cognitive system is sensing of resource usage, typically spectrum sensing. This can be generally understood as determination if a channel or other resource can be used or not by a device. In particular contexts this can be understood as referring to detection of unused radio spectrum, or detection of unused radio spectrum by primary users. In the latter case cognitive devices attempt to sense "spectrum holes". A spectrum hole is typically a frequency range, where the absence of primary users has been determined. By detecting particular spectrum hole or holes and exploiting it or them rapidly, cognitive devices can improve spectrum utilization.

Detecting the presence and/or absence of primary users can be a tedious task. Sensing the presence of primary users with an acceptable quality can be difficult for a single node. A single detection apparatus may make errors when determining whether the spectrum is free or not. The situation can be improved if nodes are allowed to cooperate by exchanging sensing results. This, however, requires communication between nodes, usually over a radio link. This information can then be used to control use of channel resources such that vacant channels are used while avoiding occupied channels. One technique attempting to provide this is so-called distributed or co-operative spectrum sensing where sensing results from more than one secondary device are combined. The combination of sensing results can enable better detection probability. In an ideal case, a cognitive radio device receives detection results from all nearby cognitive radios. In practice, however, this may be impractical due to the amount of signalling that may become generated.

The herein described embodiments aim to address one or several of the above issues.

In accordance with an embodiment there is provided a method comprising determining usefulness of resource usage sensing information in a radio system, and controlling transmission of sensing result information in the radio system based at least in part on the determined usefulness.

In accordance with an embodiment there is provided an apparatus for a radio system, the apparatus comprising at least one processor, and at least one memory including computer program code, wherein the at least one memory and the computer program code are configured, with the at least one processor, to cause determining of usefulness of a resource usage sensing result in the radio system and for controlling transmission of sensing result information at least in part on the determined usefulness.

In accordance with an embodiment there is provided an apparatus for a radio system, the apparatus comprising at least one processor, and at least one memory including computer program code, wherein the at least one memory and the computer program code are configured, with the at least one processor, to cause determining of usefulness of sensing result information provided in the radio system and sending of a message based on the determined usefulness of the sensing result information.

In accordance with an embodiment the determining comprises determining by a first node the usefulness of the resource usage sensing information for at least one second node.

In accordance with a more specific embodiment a first control apparatus is provided for a first node in a radio system, the first control apparatus being configured to provide sensing result information by means of sensing radio resource usage in the radio system and determining the usefulness of the sensing result for at least one second node.

In accordance with an embodiment at least one spectrum sensing is provided by the first node. The first control apparatus can be configured to determine usefulness of the result of at least one spectrum sensing.

In accordance with a more specific embodiment a second control apparatus is provided for a second node in a radio system, the second control apparatus being configured to determine usefulness of sensing result information provided by a first node and to cause sending of the message to the first node.

In accordance with an embodiment at least one sensing message is transmitted. Robustness of the transmission can be adjusted based on the determined usefulness.

In accordance with an embodiment a usefulness value of a spectrum sensing message is estimated for at least one node, at least one transmission parameter is chosen based on the estimated usefulness value, and transmission of the spectrum sensing message is controlled using the chosen at least one transmission parameter.

In accordance with an embodiment the control comprises controlling at least one of transmit power, modulation scheme, coding scheme, quantization scheme, amount of spectrum sensing data, number of retransmissions, time interval between transmissions of spectrum sensing messages, use of antennae, and the number of channels reported by the sensing messaging based on the determined usefulness.

A parameter based on the usefulness can be determined, and sensing result messaging can be controlled based on the parameter.

The control of transmissions may comprise controlling at least one of unicasting, multicasting and broadcasting a message. The control of transmissions may also comprise abstaining from sending a spectrum sensing message.

The determining of the usefulness can comprise at least one of estimating number of nodes in the radio system, predicting usability of sensing information in a future point of time, predicting frequency of future sensing information messages, estimating level of noise in at least one radio channel, estimating the probability for the presence of at least one primary user, considering sensing results from at least one other node and considering the number of sensing results required to determine the absence of a primary user.

The usefulness can be determined by a secondary user, and the resource usage sensing can comprise detection of usage of resources by primary users.

The determining may comprise determining by a second node the usefulness of resource usage sensing information provided in the radio system and the controlling may comprise sending from the second node a message to a first node. Communication may comprise feedback indicative of usefulness of sensing result information for at least one second node. Determining of the usefulness can take into account feedback by at least one second node. The feedback may comprise information about at least one of usefulness value for sensing information for the reporting at least one second node, reception quality of a spectrum sensing message, number of nodes in the radio system, frequency of spectrum sensing messages, noise in at least one radio channel, the probability for the presence of at least one primary user, sensing results from at least one second node, request for more, less or no sensing information and number of sensing results required to determine the absence of a primary user.

An unsolicited request regarding sensing information may be communicated to a node providing sensing information. The request may relate to at least one of need for sensing information, amount of sensing information and robustness of the transmission of sensing information.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are described in the following detailed description and in the attached claims.

For a better understanding of some embodiments of the invention, reference will be made by way of example only to the accompanying drawings in which.

In the following certain exemplifying embodiments are explained with reference to radio systems and devices. Before explaining in detail the certain exemplifying embodiments of cognitive radio systems, certain general principles of wireless communication systems and nodes thereof are briefly explained with reference to FIGS. 1 and 2 to assist in understanding of the herein described exemplifying embodiments.

Figure 1:
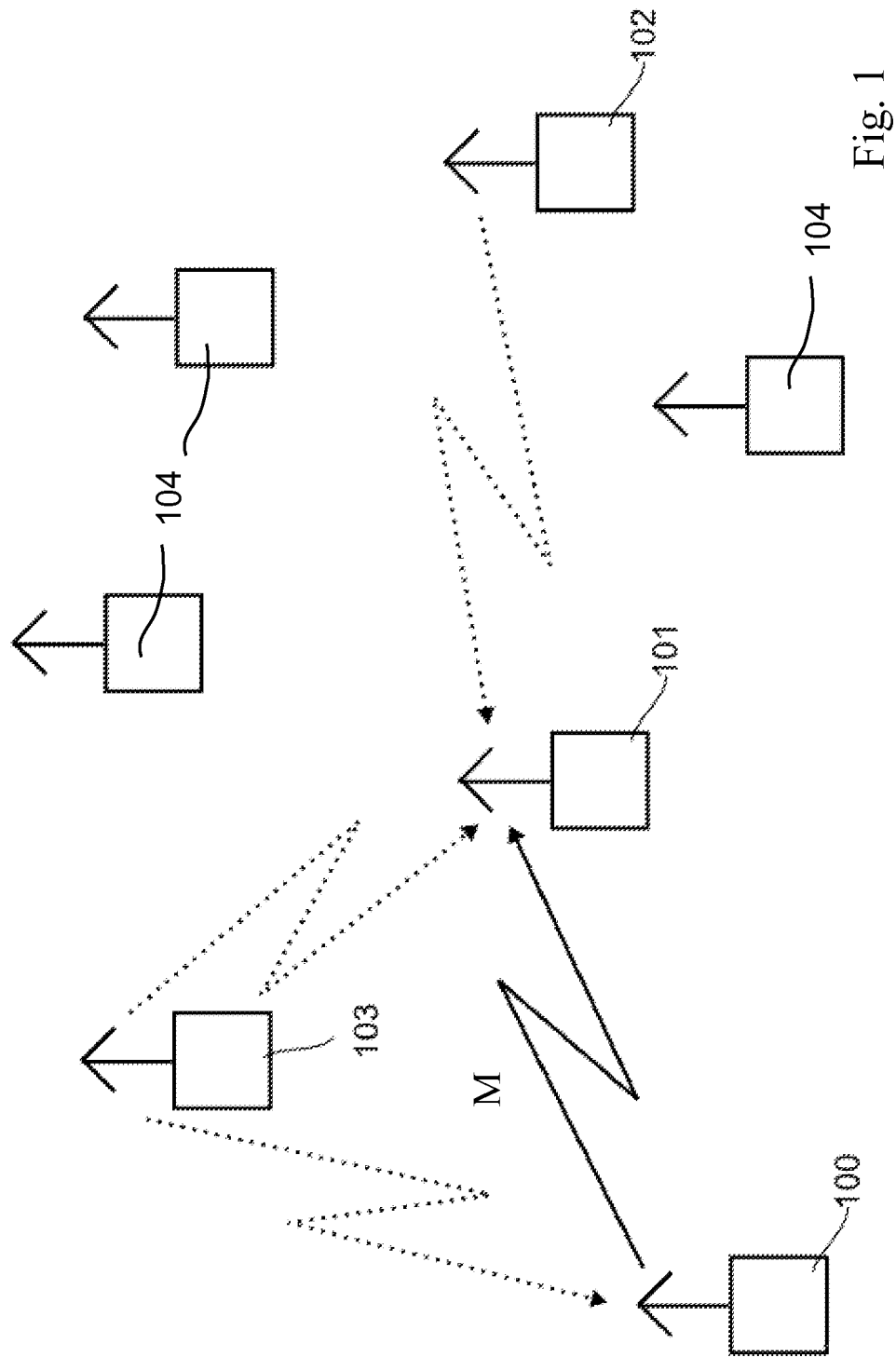
FIG. 1 shows a radio system.

FIG. 1 shows a plurality of radio devices 100 to 104 referred to herein as nodes. Nodes 100 to 103 are shown to be in communications with each other and thus form a radio system. More particularly, a system of cognitive nodes can be provided by nodes 100 to 103. In general, the various embodiments of the apparatus and the cognitive radio nodes of FIG. 1 can include, but are not limited to, mobile devices or terminals such as cellular telephones or what are known as 'smart phones', personal digital assistants (PDAs) having wireless communication capabilities, portable computers (e.g., laptops) having wireless communication capabilities, image capture devices such as digital cameras having wireless communication capabilities, gaming devices having wireless communication capabilities, music storage and playback appliances having wireless communication capabilities, as well as portable units or terminals that incorporate combinations of such functions and sensor networks, wireless access nodes (for example home or office access boxes) and so on. In other words, a node of a radio system can be provided by any appropriate radio device or station that is capable of sending and/or receiving radio signals. Each node may have one or more radio channels open at the same time and may receive signals from more than one source. Nodes 100 to 104 may be arranged to use licensed and/or unlicensed bands.

Nodes 100 to 103 of FIG. 1 are cognitive radio (CR) devices capable of sensing usage of resources in the radio system. For example, the cognitive nodes can perform cooperative spectrum sensing and transmit and/or receive spectrum sensing messages. Spectrum sensing can be provided by various techniques. For example, spectrum sensing may be performed by identifying predefined characteristics in a received signal. Such characteristics may comprise, for example, one or more of a frame rate, a symbol rate, a symbol duration, a cyclic prefix duration, a known preamble, a known synchronization sequence, a known reference signal, and so forth.

One or more of the radio devices 100 to 104, or any further device, may act as a primary user having a priority for a given radio resource. In accordance with an example relating cellular mobile systems a primary user can be provided with a mobile communication device or station that can be used for accessing various services and/or applications via a cellular system. The access can be provided via an access interface between the mobile user device and an appropriate access node of the cellular system. An access node can be provided by a base station of a communication network. Such an access would typically, but not necessarily, be provided via a licensed band. At the same time some other nodes in the radio system can be lower priority devices or secondary users utilising free spectrum if and when it is available. The arrangement is typically such that the primary user has the right to use the resource and should not be unnecessarily disturbed by secondary users.

In accordance with an example a primary system is provided by a TV system providing at least one TV channel. In this example the primary user can be provided by a node broadcasting data on the TV channel or channels. Secondary users can seek to utilise any TV white space for their communications.

Spectrum sensing may attempt to identify transmissions by primary users, for example based on known signal characteristics. For example, a cognitive radio sharing a band with one or more primary users such as TV stations transmitting a signal in accordance with the Digital Video Broadcasting-Terrestrial (DVB-T) standard may look for signal features that are unique to the DVB-T. The cognitive radio node may use statistical analysis on a received signal to identify the replication of part of a transmitted symbol in a cyclic prefix at a time offset corresponding to a symbol length supported by the DVB-T standard.

A cognitive radio device is able to detect primary users and is configured to avoid causing interference to the primary users. At least some of the cognitive nodes can collaborate in spectrum sensing, by sending spectrum sensing information to other nearby cognitive nodes. Thus, when any of nodes 100 to 103 has performed spectrum sensing, it can provide the detection result to other nodes in the system by means of spectrum sensing messaging. This can be done for example via broadcast signalling, or via multicast or unicast signalling. A receiving node may then use the results in its determination if it can use the spectrum or not. The receiving node can, for example, combine its own detection result and the received detection results. This combined detection result can then be used to estimate whether the spectrum is primary user free.

Figure 2:
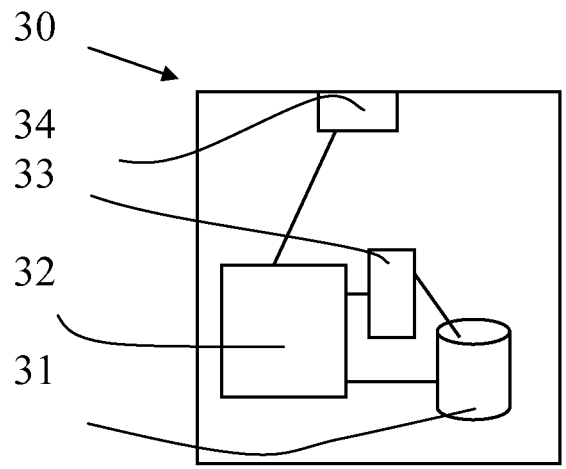
FIG. 2 shows an example of a control apparatus for a communication device.

A radio node is provided with appropriate transceiver apparatus. A node is also typically controlled by at least one appropriate controller apparatus. FIG. 2 shows an example for a controller apparatus 30 for a node. The controller apparatus is typically provided with memory capacity and at least one data processor. FIG. 2 thus shows at least one memory 31, at least one data processing unit 32 and an input/output interface 34 provided by an appropriate radio apparatus. The control apparatus of a node in accordance with an embodiment can comprise a spectrum sensing block 33. The control apparatus can be configured to execute appropriate software applications to provide the desired control functions. The control apparatus, when provided in a node and comprising at least one memory and computer program code can be configured, with the at least one processor, to cause determining how useful a resource usage sensing provided by the node is in a radio system and subsequently to control sensing messaging by the node based at least in part on the determined usefulness. The determination can be made in view of usefulness to one other node in the radio system or in view of a plurality or even all nodes in the radio system. More detailed examples for such operation will be explained in more detail below. At least some of the processing of the processing blocks may be carried out by one or more processors in conjunction with one or more memories. The processing block may be provided by an integrated circuit or a chip set. The control entity can be interconnected with other control entities.

The following describes in more details examples of how to minimize the amount of messages to save power and radio resources whilst communicating enough sensing information to enable detection of primary users with a desired probability.

In ideal case, a cognitive radio node receives detection results from all nearby cognitive radios. In practice, this may be impractical due to the amount of signalling this could cause. As spectrum sensing messages are transmitted over a radio channel they can be subject to deterioration from noise, interference, channel fading and so forth. In accordance with an embodiment the likelihood of transmission errors can be traded off against the amount of radio resources used for transmitting a message. On the other hand, a node should transmit and/or receive as little distributed sensing messages as possible to save radio resources and power but also receive enough sensing information to enable detection of primary users with appropriate probability.

Figure 3:
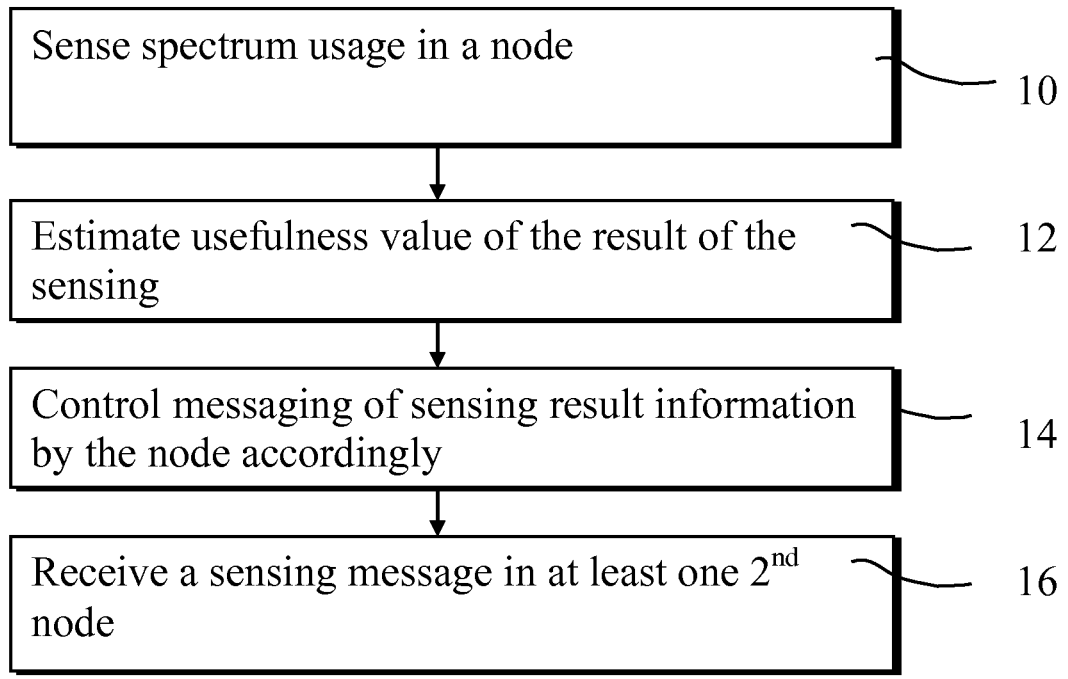
FIG. 3 is a flowchart in accordance with an embodiment.

To reduce the amount of signalling and processing, it may be that not all cognitive radio devices 100 to 103 exchange sensing results with each other. A method for selectively informing other nodes in a radio system in accordance with an embodiment is shown in FIG. 3 and is described below with a reference to the nodes of FIG. 1. In this example transmission of spectrum sensing messages by node 100 is of particular interest. Node 100 of FIG. 1 performs sensing at 10 to determine usage of radio resources in the system. For example, node 100 can perform radio spectrum sensing to detect any use by primary users of the frequency spectrum. In the example a primary user can be provided by one of nodes 104. At this stage node 100 may detect that there is one or more primary users occupying some or all of the available radio resources or that the system is free of primary users. Node 100 may identify a transmission from a primary user by detecting a known signal characteristic of a primary user in the received signal, and distinguish it from a signal transmitted by a secondary user that does not comprise the known signal characteristic. For example, if a cognitive radio node operates in a band shared with TV broadcast transmitters as primary users, node 100 may detect patterns in the received signal that are specific to TV broadcast transmissions, and based on this conclude that the user is a primary user.

After node 100 has performed sensing of used radio resources, it can process the sensing results, and can initiate the operation to broadcast the result to its neighbour nodes. Prior to transmission, however, node 100 can estimate at 12 how valuable its sensing result is to one or more arbitrary neighbours, or even all neighbours, for example to nodes 101 and/or 103. As a result of this estimation node 100 can then determine usefulness of the sensing message in the radio system.

In determining the usefulness value, node 100 may attempt to predict a future usefulness of a spectrum sensing message or messages that is or are to be sent at some point after the sensing. The predicted usefulness value may depend on the time interval between spectrum sensing and the transmission of the message. The predicted usefulness value may further depend on a statistical analysis of the sensing result. For example, node 100 may intend to transmit the next spectrum sensing message in 1000 ms (milliseconds). Further, statistical analysis of the spectrum sensing result may reveal to node 100 that a primary user (for example a wireless microphone) tends to become active in average every 500 ms. Thus, node 100 may decide that the usefulness value of the result is to be low because by the time the result is transmitted it is very likely that resource use by the primary user has already changed.

In a radio system environment, the usefulness of a single received sensing message may vary with the environment. For example, if there are only a few cognitive nodes per area the messages can be more valuable, because each node has in average only a small number of neighbours. On the other hand, high density of cognitive nodes can make the sensing messages less valuable because of high number of neighbours. Node 100 can utilise an estimate of the density of cognitive nodes and base the determination of the usefulness for example on the density of nodes in its neighbourhood. To provide a density estimate node 100 can determine the number of its neighbouring nodes and estimate the density of nodes based on the number and the radio coverage area thereof.

Node 100 can alternatively or in addition determine the frequency at which it receives sensing messages from other nodes in its vicinity. High level of transmit activity by secondary nodes can make the sensing messages more valuable because the increased noise level from secondary users can make it more difficult to detect a primary user with the required sensitivity and reliability. Low level of transmit activity by secondary nodes can make the messages in certain circumstances less valuable for the recipients because it is easier for the individual nodes to detect the presence of a primary user themselves.

However, in some other circumstances different considerations may be used. For example, the processor apparatus of node 100 can be set to determine that as long as there is an abundance of sensing messages the value of a single sensing message can be considered as being relatively low in the absence of any other indications. If node 100 decides that sensing messages are scarce and more messages would be required to react quickly enough, their value can be considered high.

If node 100 determines that the network is dense and/or sensing messages are received frequently, node 100 can conclude that the sensing result is not very valuable to its neighbours. Node 100 can therefore decide to use less radio resources for the signalling of the sensing result information. For example, node 100 can decide to use less frequent transmissions, less transmit power, shorter message with less robust modulation and/or coding scheme and so on for sending information about the sensing results. It is even possible that node 100 decides that it shall not send the results at all.

On the other hand, if node 100 determines for example that only a few cooperating nodes are around and/or sensing messages are detected only sparsely, node 100 can conclude that its result has a high value to its neighbours. Consequently, node 100 can decide to use more resources, for example to transmit sensing messages more frequently, with more power, and/or with more robust modulation and/or coding scheme and so on.

The control may alternatively or in addition also comprise use of a different quantization scheme, a different number of retransmissions, use of different antennae arrangement and a different amount of sensing data (for example covering a different number of channels) depending on the determined usefulness value.

Use of different antenna arrangements can comprise use of different antenna parameters. For example, the number of transmit antennae in multiple input multiple output (MIMO) arrangements can be varied. In accordance with a possibility the type of transmission scheme such as Alamouti diversity coding or spatial MIMO multiplexing are controlled based on the usefulness of the sensing results.

The usefulness can also be determined taking into account other factors, either alone or in any appropriate combination. For example, a level of noise in a radio channel can be estimated. The node can then estimate based on the determined signal-to-noise ratio the reliability of the sensing result, and use this estimate as a basis of the determination of the usefulness. The probability for the presence of a primary user can be estimated. Sensing results from at least one other node can be taken into account. Frequency of future spectrum sensing messages may be predicted. The usefulness value of a sensing message can also be estimated based on the number of sensing results that is required to determine the absence of a primary user with a given reliability. The more results are needed the more valuable each message becomes.

The likelihood of a primary user being present can also be considered. For example, if a node such as a TV station has been continuously sensed on a channel for a long time, for example the past thirty six hours, there is little use to perform aggressive sensing to catch a short, for example 5 ms "spectrum hole". On the other hand, for a channel with a history of irregular and bursty transmissions, fast sensing and messaging may be a good choice.

Node 100 can then control at 14 transmission of the sensing result in message M accordingly. Transmission at 14 may comprise a broadcast of the message M to all neighbours. According to a possibility transmission at 14 may comprise multicasting the message M to a set of neighbours. According to another possibility transmission at 14 may comprise unicasting the message to a single recipient. The identity of recipients of the message M may be known to node 100, or the recipients may be anonymous. Recipients may be addressed in unicast transmissions by an individual node identity or in multicast by a group identity, for example. The message M can then be received at 16 by neighbours, for example node 101, who can then use the sensing information included in the sensing message as it would have been received from any node.

Figure 4:
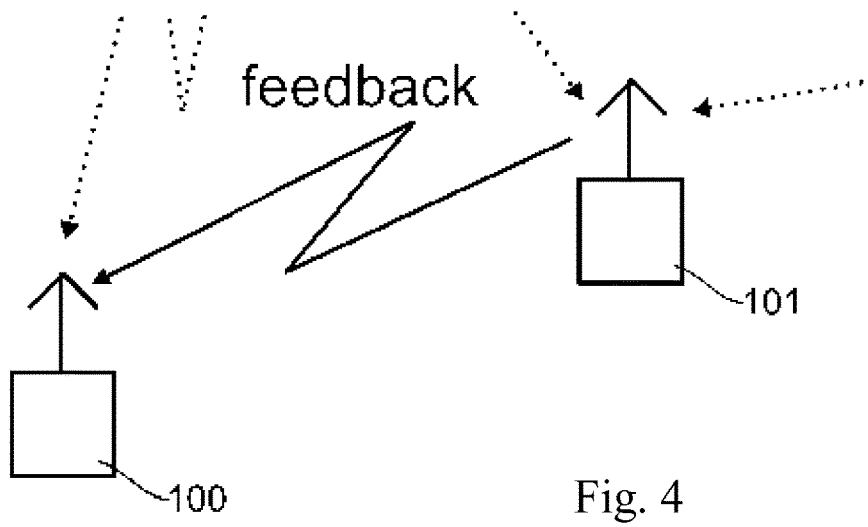
FIG. 4 shows a further embodiment.
Figure 5:
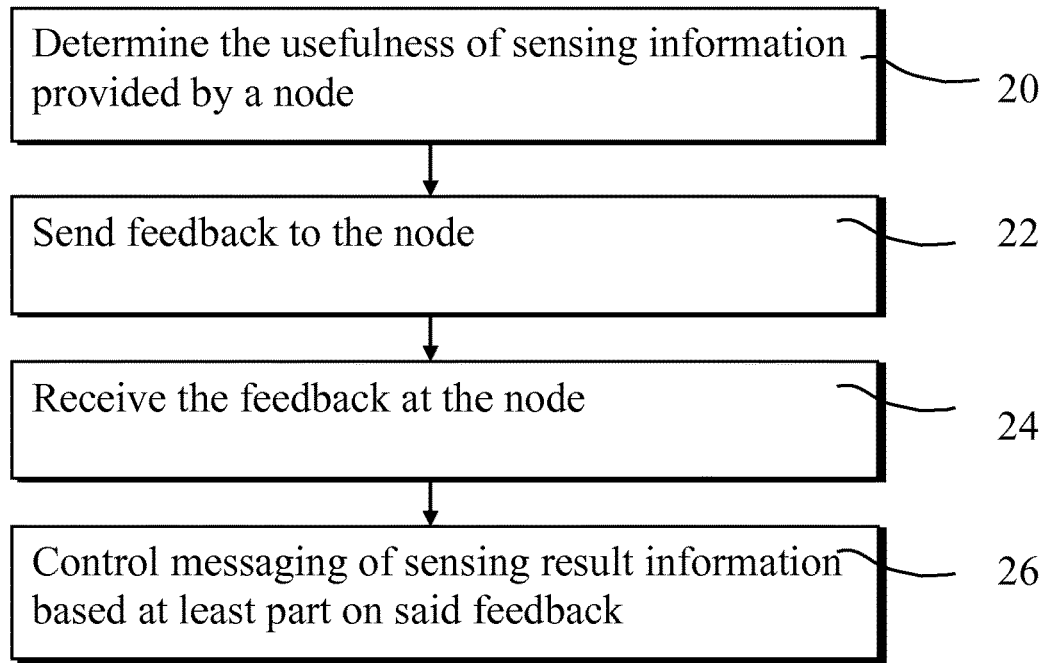
FIG. 5 is a flowchart in accordance with the embodiment of FIG. 4.

In accordance with a further embodiment illustrated in FIGS. 4 and 5, a receiving node, for example node 101 in FIGS. 1 and 4, can determine the usefulness of sensing result information that can be provided in the system by at least one other node. The node can then send a message to relevant node or nodes, for example feedback in view of received information and/or a report in view of its needs. This information can be delivered as a point-to-point message, by means of broadcasting or by means of multicasting. The information by node 101 can then be used in determination of the usefulness by node 100.

For example, node 101 may determine at 20 how useful the sensing information it received from node 100 was. It can then report feedback at 22 to node 100 its local situation in this regard. Node 101 can thus take part in the control of sensing information messaging by reporting how valuable the spectrum sensing results by node 100 are currently to node 101. Node 100 can receive at 24 feedback information from more than one node. Node 100 can take the feedback into account at 26 when determining a usefulness value. In FIG. 3 this would mean taking the feedback into account at 12 when determining the usefulness.

In accordance with an embodiment reporting by the receiving node is, instead of direct feedback, sent spontaneously and not in response to anything. For example, node 101 may determine that more or less sensing result information could be useful, and may thus send a message requesting for more or less sensing information, respectively. The receiving node may even determine that sensing information from other nodes is not useful, and accordingly inform the other nodes that it does not need any further sensing information. Node 101 may also send other types of request, for example request for more or less robust transmission, encoding and so on. In accordance with a specific example the report can be a "one-bit request", for example '0' being indicative of the need to receive more information/more robust transmission and '1' less information/less robust transmission. In accordance with another example the receiving node sends a message informing the sensing node(s) about its need for sensing information in a scale, for example "9 on the scale of 10".

The feedback can comprise various types of information. For example, the feedback can comprise information of the reception quality of a spectrum sensing message. Number of nodes in the radio system as detected by the reporting node may also be indicated. An indication of frequency of received spectrum sensing messages may be provided. The feedback may also provide information regarding noise in at least one radio channel. Estimation of the probability for the presence of at least one primary user by the reporting node may be provided. The reporting node may also send its own sensing results. The reporting node may also indicate the number of sensing results it requires to be able to appropriately determine the presence or absence of a primary user.

The usefulness value may be quantized to a predetermined range. For example, the usefulness value may be selected from a range '0' to '10'. For example, in view of the feedback messaging, value '0' can be used to indicate that too many spectrum sensing messages are received, and value '10' at the other end of the scale that the reporting node will not be able to operate at all without more spectrum sensing results. The usefulness value may even be quantized to one bit. Value '1' can be used to indicate, for example, that more spectrum sensing information is required, and value '0' can be used to indicate that the transmission of less spectrum sensing information is needed. Use of additional radio resources for the data transmission can then be controlled accordingly. In accordance with a possibility the usefulness value may be quantized to "no bits", and transmission of a message itself from a receiving node may indicate a need for additional spectrum sensing information.

Figure 6:
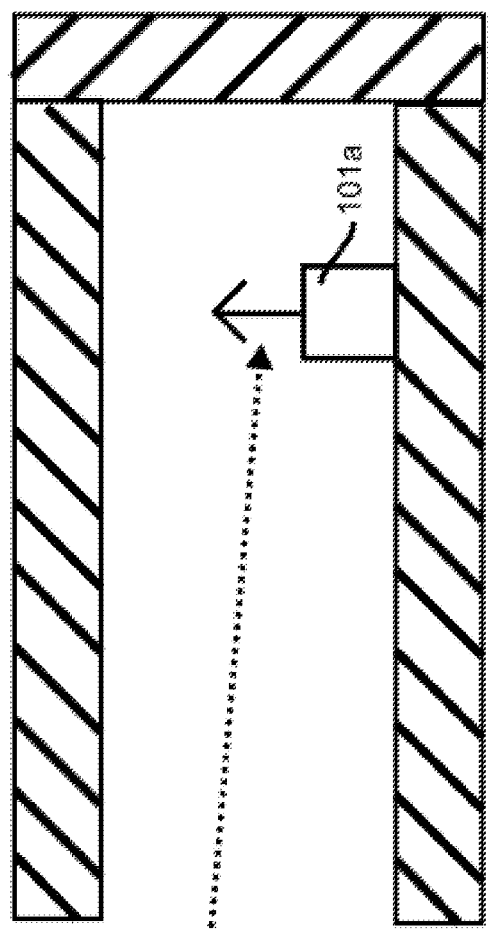
FIG. 6 shows a yet further embodiment.

In accordance with a further embodiment shown in FIG. 6, node 100 may be in a crowded radio environment with many neighbours while node 101a can be shadowed, for example by walls. This illustrates a situation where a node can receive messages from fewer neighbours than the other nodes in the system. In the particular situation of FIG. 6 node 101a can only receive sensing information from node 100. For this reason node 101a would benefit from above average number of transmissions of sensing messages. To provide this, it is possible for node 101a, in response to detection that it is not receiving enough sensing information, or information from more than one node, to send a request for more sensing information to compensate for the lack of sufficient number of sensing messages.

Node 100 can determine based on the feedback from node 101a that the value of its sensing information must be high for node 101a. It can therefore control its sensing message transmissions such that node 101a receives sufficient information for the control thereof. The sensing information can be broadcast so that all nodes receive the message according to the needs of node 101a, or then node 100 can send one or more point-to-point sensing messages only to node 101a. For example, node 100 may provide sensing information on specific resources used by node 101a in a point-to-point transmission. Node 100 may optimize the transmission for reception at node 101a by using pre-coding that uses known information on the radio channel between node 100 and node 101. Node 100 may further continue to provide sensing information on a larger set of resources to all neighbours using another broadcast message.

It is noted that although the term radio system is used herein cooperative sensing does not require any established network infrastructure. For example, the relevant nodes may simply broadcast information about their sensing results periodically. Therefore, node 100 is not necessarily concerned about the actual identities of the cooperating nodes such as nodes 101 or 103. The term radio system can thus be understood as referring to radio devices that can use same resources.

Co-operative sensing can be provided via cognitive control signalling. This can be provided as a part of a cognitive control network functionality. Signalling between cognitive nodes of a cognitive control network may be performed via physical radio links, either permanently or temporarily as specified for this purpose. According to a possibility the signalling can be provided via logical links, for example such that cognitive control signalling between cognitive nodes is arranged via a server, such as an Internet Protocol (IP) server.

It is noted that the radio technology for control signalling between cognitive nodes can be different than the radio technology for data transmission between the same nodes.

In accordance with an embodiment a node provides the sensing facility of a radio system and informs the other nodes accordingly, taking the usefulness of its sensing results into account. According to an alternative a few cognitive nodes, but not all cognitive nodes, of a radio system are provided with a sensing capability.

It should be appreciated that the embodiments may be applied in any current or future standard or non-standard radio system that supports cognitive radios and/or comprises a plurality of cognitive radios. The access may be based on code division multiple access (CDMA), or wideband CDMA (WCDMA), orthogonal frequency-division multiple access (OFDMA), time division multiple access (TDMA), frequency division multiple access (FDMA), space division multiple access (SDMA) and so on. As non-limiting examples, aspects of the exemplary embodiments of the invention may be implemented in a wireless local area network (WLAN) and/or WiMax (Worldwide Interoperability for Microwave Access), in cellular access networks such as third Generation Partnership Project (3GPP) universal terrestrial radio access network (UMTS) terrestrial radio access network (UTRAN) or evolved UTRAN (E-UTRAN) based wireless communication system. Nodes 100 to 110 may be arranged to support one or more cognitive technologies to communicate detection estimates with each other. For instance, a device may be arranged to support at least one of IEEE 802.15 specification describing a system using unlicensed bands, the IEEE 802.22 working group developing a standard for a system operating on unused television channels and third Generation Partnership Project (3GPP) long term evolution (LTE) cognitive radio features. It shall be appreciated that these are non-limiting examples only, and that the herein described principles may be applied in any system where detection of used radio resources and control of transmission of the results is desired. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a node of the radio system may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), a field programmable gate array (FPGA), gate level circuits and processors based on multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor-based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for controlling sensing operations, for estimating usefulness of the sensing results, for determining an appropriate usefulness value based thereon, and for controlling communications of sensing information from a node to one or more receiving nodes. Similarly, a program code product can be used at a node receiving the sensing reports, for example for generating feedback reports and causing transmission thereof. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The herein described exemplifying embodiments can provide a variable trade-off between reliability and resource use for the signalling of spectrum sensing information. Some of the embodiment can be provide adapting of a cooperative sensing scheme to the prevailing radio environment such that it takes both cognitive secondary and primary users into account. Power consumption of battery-powered devices may also be taken intro consideration.

It is also noted herein that while the above describes exemplifying embodiments of the invention, there are several variations and modifications which may be made to the disclosed solution without departing from the spirit and scope of the present invention.

In accordance with certain aspects the invention may be embodied as follows.

As a method comprising:
determining by a node usefulness of resource usage sensing information in a radio system; and
controlling transmission of sensing information by the node based at least in part on the determined usefulness.

The method according to above, where the determining comprises determining by the node the usefulness of the resource usage sensing information for at least one second node.

The method according to above, comprising:
performing at least one spectrum sensing by the first node, and
determining usefulness of the result of the at least one spectrum sensing for at least one second node.

The method according to above, comprising transmitting at least one sensing message, wherein the controlling comprises adjustment of robustness of the transmission based on the determined usefulness.

The method according to above, comprising:
estimating a usefulness value of a spectrum sensing message for at least one node;
choosing at least one transmission parameter based on the estimated usefulness value; and
controlling transmission of the spectrum sensing message using the chosen at least one transmission parameter.

The method according to above, comprising controlling at least one of transmit power, modulation scheme, coding scheme, quantization scheme, amount of spectrum sensing data, number of retransmissions, time interval between transmissions of spectrum sensing messages, use of antennae, and the number of channels reported by the sensing messaging based on the determined usefulness.

The method according to above, where the determining of the usefulness comprises at least one of:
estimating number of nodes in the radio system;
predicting usability of sensing information in a future point of time;
predicting frequency of future sensing information messages;
estimating level of noise in at least one radio channel;
estimating the probability for the presence of at least one primary user;
considering sensing results from at least one other node;
considering the number of sensing results required to determine the absence of a primary user; and
taking into account feedback by at least one second node.

As a method comprising:
determining usefulness of resource usage sensing information for a node in a radio system, and
sending from the node a message based on the determined usefulness of the resource usage sensing information.

The method according to above, comprising sending a message containing information about at least one of:
feedback indicative of usefulness of sensing result information received from at least one second node;
reception quality of a spectrum sensing message;
number of nodes in the radio system;
frequency of spectrum sensing messages;
noise in at least one radio channel;
the probability for the presence of at least one primary user;
sensing results by the node;
a request for more, less or no sensing information; and
number of sensing results required to determine the absence of a primary user.

As an apparatus for a radio system, the apparatus comprising:
at least one processor, and
at least one memory including computer program code,
wherein the at least one memory and the computer program code are configured, with the at least one processor, to cause determining of usefulness of a resource usage sensing result in the radio system and for controlling transmission of sensing result information at least in part on the determined usefulness.

The apparatus according to above, comprising a control apparatus for a node in the radio system, the control apparatus being configured to cause sensing of radio resource usage in the radio system, to provide sensing result information based on the sensed radio resource usage, and to determine the usefulness of the sensing result information for at least one second node.

The apparatus according to above, where the apparatus is configured to determine usefulness of the result of at least one spectrum sensing.

The apparatus according to above, wherein the apparatus is configured to control transmission of sensing result messages based on adjustment of robustness of the transmission based on the determined usefulness.

The apparatus according to above, wherein the apparatus is configured to control at least one of transmit power, modulation scheme, coding scheme, quantization scheme, amount of spectrum sensing data, number of retransmissions, time interval between transmissions of spectrum sensing messages, use of antennae, and the number of channels reported in sensing result information messages.

The apparatus according to above, wherein the apparatus is configured to at least one of:
  estimate number of nodes in the radio system;
  predict usability of sensing information in a future point of time;
  predict frequency of future sensing information messages;
  estimate level of noise in at least one radio channel;
  estimate the probability for the presence of at least one primary user;
  consider sensing results from at least one other node;
  consider the number of sensing results required to determine the absence of a primary user; and
  take into account feedback information from at least one other node.

The apparatus according to above, wherein the apparatus is configured to sense usage of resources by primary users and to report results of the sensing to at least one secondary user.

As an apparatus for a radio system, the apparatus comprising:
  at least one processor, and
  at least one memory including computer program code, wherein the at least one memory and the computer program code are configured, with the at least one processor, to cause determining of usefulness of sensing result information provided in the radio system and sending of a message based on the determined usefulness of the sensing result information.

The apparatus according to above, comprising a control apparatus for a node in the radio system, the control apparatus being configured to determine usefulness of sensing result information provided by another node and to send the message to the other node.

The apparatus according to above, wherein the apparatus is configured to send feedback indicative of usefulness of sensing result information received from at least one other node.

The apparatus according to above, where the message contains information about at least one of:
  usefulness of sensing information received from at least one other node;
  reception quality of a spectrum sensing message;
  number of nodes in the radio system;
  frequency of spectrum sensing messages;
  noise in at least one radio channel;
  the probability for the presence of at least one primary user;
  sensing results by the node;
  request for more, less or no sensing information; and
  number of sensing results required to determine the absence of a primary user.

The invention claimed is:

1. A method comprising:
  performing sensing, by a first mobile device, of a frequency spectrum;
  generating, by the first mobile device based on the sensing, sensing result information, wherein the sensing result information indicates whether the first mobile device detected one or more primary users using the frequency spectrum;
  determining, by the first mobile device, usefulness of the sensing result information in a radio system, wherein the determining of the usefulness is based at least partly on at least one of the following steps:
    determining a number of neighbor nodes detected by the first mobile device,
    determining a number of neighbor nodes detected by at least one second mobile device,
    determining a rate at which the first mobile device receives sensing messages, or
    determining a rate at which the at least one second mobile device receives sensing messages; and
  controlling, by the first mobile device based on the determined usefulness, transmission of the sensing result information in a message to the at least one second mobile device in the radio system for enabling the at least one second mobile device to combine its own spectrum sensing result information and the sensing result information in the message to determine whether the frequency spectrum is used by the one or more primary users, wherein the controlling transmission comprises determining whether to transmit the message to the at least one second mobile device.

2. The method according to claim 1, wherein the determining of the usefulness comprises determining, for the at least one second mobile device, usefulness of the sensing result information.

3. The method according to claim 1, further comprising:
  estimating a usefulness value, for the at least one second mobile device, of a spectrum sensing message;
  choosing at least one transmission parameter based on the estimated usefulness value; and
  controlling transmission of the spectrum sensing message to the at least one second mobile device using the chosen at least one transmission parameter.

4. The method according to claim 1, wherein the controlling transmission of the sensing result information comprises controlling at least one of a transmit power, a modulation scheme, a coding scheme, a quantization scheme, an amount of spectrum sensing data, a number of retransmissions, a time interval between transmissions of spectrum sensing messages, a use of antennae, and a number of channels reported in spectrum sensing messages based on the determined usefulness.

5. The method according to claim 1, further comprising determining a parameter based on the determined usefulness, wherein the controlling transmission of the sensing result information to the at least one second mobile device is based on the parameter.

6. The method according to claim 1, wherein the determining of the usefulness comprises at least one of:
  estimating a number of mobile devices in the radio system;
  predicting usability of sensing information at a future point of time;
  predicting a rate of future sensing information messages;
  estimating a level of noise in at least one radio channel;
  estimating a probability for a presence of the one or more primary users;
  considering sensing results from at least one other mobile device; or
  considering a numerical value of sensing results required to determine an absence of the one or more primary users.

7. The method according to claim 1, wherein the first mobile device is a secondary user, and wherein the sensing result information comprises information regarding usage of resources by the one or more primary users.

8. The method according to claim 1, further comprising:
determining, by the at least one second mobile device, actual usefulness of the sensing result information; and
sending, by the at least one second mobile device, a message to the first mobile device indicating the actual usefulness.

9. The method according to claim 1, further comprising: receiving, by the first mobile device, feedback indicative of actual usefulness of the sensing result information.

10. The method according to claim 9, wherein the feedback comprises information about at least one of:
a usefulness value for the sensing result information;
reception quality of a spectrum sensing message;
a number of mobile devices in the radio system;
a rate of spectrum sensing messages;
noise in at least one radio channel;
a probability for a presence of at least one primary user;
sensing results from the at least one second mobile device;
an amount of sensing information requested; and
a number of sensing results required to determine an absence of a primary user.

11. An apparatus for a radio system, the apparatus comprising:
at least one processor, and
at least one memory including computer program code, wherein the at least one memory and the computer program code are configured, with the at least one processor, to cause the apparatus to:
perform sensing of a frequency spectrum;
generate, based on the sensing, sensing result information, wherein the sensing result information indicates whether the apparatus detected one or more primary users using the frequency spectrum;
determine usefulness of the sensing result information in the radio system, wherein the determining of the usefulness is based at least partly on at least one step of the following steps:
determining a number of neighbor mobile devices detected by the apparatus,
determining a number of neighbor mobile devices detected by at least one second apparatus in the radio system,
determining a rate at which the apparatus receives sensing messages, or
determining a rate at which the at least one second apparatus in the radio system receives sensing messages; and
control, based at least in part on the determined usefulness, transmission of the sensing result information in a message to the at least one second apparatus for enabling the at least one second apparatus to combine its own spectrum sensing result information and the sensing result information in the message to determine whether the frequency spectrum is used by the one or more primary users, wherein the controlling transmission comprises determining whether to transmit the message to the at least one second apparatus.

12. The apparatus according to claim 11, comprising a first control apparatus, the first control apparatus being configured to provide sensing result information by sensing radio resource usage in the radio system and determine usefulness of a sensing result for the at least one second mobile device.

13. The apparatus according to claim 12, wherein the first control apparatus is further configured to determine usefulness of a result of at least one spectrum sensing.

14. An apparatus for a radio system, the apparatus comprising:
at least one processor, and
at least one memory including computer program code, wherein the at least one memory and the computer program code are configured, with the at least one processor, to cause:
performing sensing, by a first node in the radio system, of a frequency spectrum;
generating, by the first node based on the sensing, sensing result information, wherein the sensing result information indicates whether the first node detected one or more primary users using the frequency spectrum;
determining, by the first node, usefulness of the sensing result information, wherein the determining of the usefulness is at least based partly on at least one step of the following steps:
determining a number of neighbor nodes detected by the first node,
determining a number of neighbor nodes detected by at least one second node in the radio system,
determining a rate at which the first node receives sensing messages, or
determining a rate at which the at least one second node receives sensing messages; and
controlling, by the first node based at least in part on the determined usefulness, transmission of the sensing result information in a message to the at least one second node for enabling the at least one second node to combine its own spectrum sensing result information and the sensing result information in the message to determine whether the frequency spectrum is used by the one or more primary users, wherein the controlling transmission comprises determining whether to transmit the message to the at least one second node.

15. The apparatus according to claim 14, wherein the first node comprises the apparatus, the radio system further comprising a second control apparatus for the at least one second node in the radio system, the second control apparatus being configured to determine actual usefulness of sensing result information provided by the first node.

16. The apparatus according to claim 14, wherein the at least one memory and the computer program code, with the at least one processor, are configured to cause estimating a usefulness value of a spectrum sensing message, choosing at least one transmission parameter based on the estimated usefulness value, and controlling transmission of the spectrum sensing message based on the chosen at least one transmission parameter.

17. The apparatus according to claim 14, wherein the at least one memory and the computer program code, with the at least one processor, are configured to cause controlling at least one of:
a transmit power,
a modulation scheme,
a coding scheme,
a quantization scheme,
an amount of spectrum sensing data,
a number of retransmissions,
a time interval between transmissions of spectrum sensing messages,
a use of antennae, and
a number of channels reported in sensing result information messages.

18. The apparatus according to claim 14, wherein the at least one memory and the computer program code, with the at least one processor, are configured to cause at least one of:
- estimating a number of nodes in the radio system;
- predicting usability of sensing information at a future point of time;
- predicting a rate of future sensing information messages;
- estimating a level of noise in at least one radio channel;
- estimating a probability for a presence of at least one primary user;
- considering sensing results from at least one other node; and
- considering a number of sensing results required to determine an absence of a primary user.

19. The apparatus according to claim 14, wherein the at least one memory and the computer program code are configured, with the at least one processor, to cause communicating of feedback indicative of usefulness of sensing result information received from the at least one second node.

20. The apparatus according to claim 19, wherein the feedback comprises information about at least one of:
- a usefulness value for the sensing result information received from the at least one second node;
- reception quality of a spectrum sensing message;
- a number of nodes in the radio system;
- a rate of spectrum sensing messages;
- a noise in at least one radio channel;
- a probability for a presence of at least one primary user;
- sensing results from the at least one second node;
- an amount of requested sensing information; and
- a number of sensing results required to determine an absence of a primary user.

* * * * *